United States Patent [19]

Negishi et al.

[11] Patent Number: 4,996,619
[45] Date of Patent: Feb. 26, 1991

[54] APPARATUS FOR ADJUSTABLY SUPPORTING A HEAD CARRIAGE

[75] Inventors: Kenji Negishi; Hidemi Sasaki; Takeshi Fujishiro, all of Tokyo, Japan

[73] Assignee: Fuji Photo Film Co., Ltd., Kanagawa, Japan

[21] Appl. No.: 403,433

[22] Filed: Sep. 6, 1989

Related U.S. Application Data

[62] Division of Ser. No. 149,237, Jan. 27, 1988, Pat. No. 4,873,598.

[30] Foreign Application Priority Data

| Feb. 5, 1987 | [JP] | Japan | 62-25431 |
| Feb. 5, 1987 | [JP] | Japan | 62-25432 |
| Feb. 10, 1987 | [JP] | Japan | 62-30038 |
| Feb. 10, 1987 | [JP] | Japan | 62-30039 |
| Mar. 26, 1987 | [JP] | Japan | 62-73676 |

[51] Int. Cl.⁵ .................. G11B 21/24; G11B 5/56
[52] U.S. Cl. .................. 360/109; 360/106; 360/78.04; 360/78.12
[58] Field of Search .......... 360/78.02-78.04, 360/78.12, 106, 109

[56] References Cited

U.S. PATENT DOCUMENTS

| 4,313,141 | 1/1982 | Yanagida et al. | 360/78.02 |
| 4,652,952 | 3/1987 | Maeda | 360/106 |
| 4,779,155 | 10/1988 | Ohkita et al. | 360/106 |
| 4,809,106 | 2/1989 | Inoue | 360/106 |

FOREIGN PATENT DOCUMENTS

| 62-260 | 1/1987 | Japan . |
| 62-20181 | 1/1987 | Japan . |
| 2147728 | 5/1985 | United Kingdom | 360/106 |

Primary Examiner—John H. Wolff
Attorney, Agent, or Firm—Sughrue, Mion, Zinn, Macpeak & Seas

[57] ABSTRACT

A mechanism for supporting a head carriage provided with a magnetic head to magnetically record still image information or the like into a magnetic disc or reproduce such information therefrom. In the support mechanism, the two ends of a lead screw having a threaded portion almost in the center portion thereof are respectively received by two bearings each having two, substantially perpendicularly intersecting surfaces, and the head carriage, which can be guided and moved by the lead screw, is also provided with two, substantially perpendicularly intersecting surfaces touchable with a shaft of the lead screw. By energizing the head carriage in a given direction by a spring, the head carriage two intersecting surfaces can be brought into contact with the lead screw and the lead screw can be brought into contact with the intersecting surfaces of the respective bearings.

6 Claims, 14 Drawing Sheets

APPARATUS FOR ADJUSTABLY SUPPORTING A HEAD CARRIAGE

This is a divisional of application Ser. No. 07/149,237 filed Jan. 27, 1988 now U.S. Pat. No. 4,873,598.

BACKGROUND OF THE INVENTION

1. Field of the Invention

The present invention relates to a head carriage support mechanism and, in particular, to a head carriage support mechanism to be provided with a magnetic head which is used especially in a magnetic recording or reproducing apparatus in an electronic camera system or the like to magnetically record still image information or the like into a magnetic disc or reproduce such still image information from the magnetic disc.

2. Description of the Related Art

Recently, there has been developed an attractive electronic camera system wherein an image pickup device, such as a solid image pickup element, an image pickup tube or the like, is combined with a recording device employing, as a recording medium, an inexpensive magnetic disc having a comparatively higher memory capacity to photograph an object electronically and record it into the rotating magnetic disc and to reproduce an image by a television system or a printer separatly provided.

The magnetic disc used in the above-mentioned camera system has a diameter of the order of 50 mm. And, in the above-mentioned system, a head carriage provided with a magnetic head can be moved in the radial direction of the magnetic disc to thereby magnetically record or reproduce still image information into or from the magnetic disc for each of tracks provided on the magnetic disc.

Referring now to FIG. 21, there is shown a sectional view of a magnetic head feeding device according to the above-mentioned prior art. In this figure, a lead screw 10 has a threaded portion 10A in the central portion thereof and, on either side of the threaded portion 10A, there are mounted oilless metal sections 12 and 14, respectively. A head carriage 16 includes a needle 18 biased by a tension spring 18A to engage with the threaded portion 10A and also has slidable portions 16A and 16B which can slide over the above-mentioned oilless metals sections 12 and 14, respectively. The slidable portions 16A and 16B are formed of resin or the like, respectively. In addition, to the above head carriage, there is mounted a magnetic head which is not shown.

The above-mentioned lead screw 10 is mounted through ball bearings 20 and 22 to the main body 24 of the magnetic recording or reproducing apparatus and is further connected to a stepping motor 28 through a coupling 26. Therefore, if the stepping motor 28 is rotated a predetermined amount, the lead screw 10 is also rotated on the other hand, on the side of the head carriage that does not rotate the needle 18 thereof is guided by the threaded portion 10A of the lead screw 10 so that the head carriage 16 is moved a predetermined amount in the axial direction of the lead screw 10 and, at the same time, the magnetic head is also moved in the radial direction of the magnetic disc.

However, due to the fact that the above-mentioned prior art head carriage 16 is adapted to slide in a surface contact manner, the oilless metal sections 12 and 13 or similar means on the shafts at both ends of the threaded portion 10A of the lead screw 10. Also, since the lead screw is supported by means of the ball bearings, there is a problem in the prior art head carriage that the structure is complicated in structure and is difficult to assemble.

Further, unlike a magnetic disc used in an ordinary magnetic recording/reproducing apparatus, a higher density of still or moving image information is recorded in the magnetic disc used in the electronic camera or the like, and also it is rotating at a higher speed. For this reason, the magnetic head, which must be in contact to record into or reproduce from such a magnetic disc, requires accurate adjustment of position with respect to the magentic-disc.

In view of the above-mentioned circumstances, the magnetic head used to record or reproduce the still image information and the like in the electronic camera or the like must be adjusted in the following five respects: namely, (1) an amount of projection or extension, (2) an angle of inclination, (3) a shift in center alignment, (4) a shift in azimuth, and (5) a tilt. The above-mentioned five types of adjustments will be discussed below sequentially in connection with FIGS. 22 through 24.

In FIG. 22, 32 designates a magnetic disc, 1 a magnetic head to record into or reproduce from the magnetic disc, and 6 a regulation plate disposed at a position opposed to the magnetic head 1 with the magnetic disc 32 disposed therebetween to locate the magnetic disc 32 along the magnetic head 1. The magnetic head 1 requires a predetermined range of extension amount Ea with respect to the magnetic disc 32. For better recording and reproduction as well as in order to prevent wear in the magnetic head and recording medium, a fine adjustment must be carried out.

In order to be able to obtain an excellent reproduction image even when the same recording medium is loaded into different reproducers, and further when a recording head and a reproducing head, which are provided separately from each other, are employed, as in a case wherein a recorder and a reproducer are constructed separately from each other, the angle of inclination $\theta a$ of the magnetic head as shown in FIG. 22, the center alignment shift amount Eb of the magnetic head 1 with respect to the center of the magnetic disc 32 and the azimuth shift $\theta b$ of the magnetic head 1 as shown in FIG. 23, and the tilt angle $\theta c$ of the magnetic head 1 with respect to the magnetic disc 32, as shown in FIG. 24, must be within a predetermined range which is compatible.

In the prior art, to mount the magetic head, the magnetic head is set at a proper position, the head carriage is moved in the feeding direction of the magnetic head with respect to the magnetic head, the contact surface of an L-shaped head mounting plate previously provided in the head carriage is made to approach the contact surface of the magnetic head, and then adhesives are poured in between the two contact surfaces.

However, in the above-mentioned magnetic head mounting method, since the L-shaped head mount plate and the magnetic head are bonded to each other in a surface-to-surface contact manner, there is a possibility that the position of the magnetic head may be out of order by the influences due to temperature changes or curing contraction when the thicknesses of the adhesive layer are not even or are $100\mu$ or more.

If such position disorder is corrected by mechanically deforming the L-shaped head mount plate, for example, to adjust the azimuth shift of the magnetic head, then there arises another problem that the remaining adjustments of the magnetic head may be out of order.

SUMMARY OF THE INVENTION

It is an object of the invention to provide a head carriage mechanism which is simple in structure and easy to assemble, and eliminates the need of oilless metals or similar parts.

It is another object of the invention to provide a head carriage mechanism in which is simple in structure and easy to assemble, and eliminates the need of oilless metals or similar parts.

It is another object of the invention to provide a head carriage mechanism in which a magnetic head can be retreated by a simple mechanism in a direction substantially perpendicularly intersecting with the plane of rotation of a magnetic disc and also the azimuth of the magnetic head can be adjusted with ease.

In order to attain the above objects, according to one aspect of the invention, there is provided a head carriage mechanism which includes two bearings each having two surfaces substantially perpendicularly intersecting with each other and adapted to be in contact with the shaft of a lead screw at the two ends of the lead screw having a threaded portion substantially in the central portion thereof a head carriage is provided and includes a needle engageable with the threaded portion of the lead screw, and has two substantially perpendicularly intersecting surfaces, respectively in contact with the shaft of the lead screw in the two portions of the shaft each adjoining the threaded portion thereof; the two intersecting surfaces also face the two surfaces of the two bearings a spring for energizing the head carriage is provided so as to bring the two surfaces of the head carriage and the two surfaces of the bearings into contact with the shaft of the lead screw.

In other words, the lead screw is supported by the two bearings respectively provided in the two ends of the lead screw and having the two substantially perpendicularly intersecting surfaces; the head carriage is energized to be brought into contact with the lead screw by means of the substantially perpendicularly intersecting surfaces thereof, and is mounted such that it can be slided freely in the axial direction of the lead screw. Therefore, the sliding resistance of the head carriage can be minimized and thus the need to mount oilless metals to the shaft of the lead screw is eliminated.

According to another aspect of the invention, there is provided a head carriage support mechanism provided with a magnetic head which can be moved in the radial direction of a rotating magnetic disc to magnetically record into or reproduce from the magnetic disc; One end of the head carriage is guided by a guide shaft such that it can be rotated around the axis thereof and also can be slided freely in the axial direction thereof. A projection is provided on the lower surface of the other end of the head carriage, and the head carriage is energized such that the projection can be brought into contact with the upper surface of a main body of a magnetic recording/reproducing apparatus on which the head carriage is disposed.

In other words, the one end portion of the head carriage is guided by the guide shaft and, on the side of the other end portion of the head carriage, the projection provided on the lower surface thereof is slided on the upper surface of the apparatus main body, whereby a guide shaft can be saved.

At least one of two bearings respectively provided in the two ends of a guide shaft for guiding the head carriage can be moved freely in a direction perpendicularly intersecting the axial direction of the guide shaft in parallel the magnetic head is bonded to the head carriage, the freely movable bearing is moved to thereby move in parallel or incline the head carriage within a plane parallel to a magnetically recording or reproducing plane, so that the azimuth shift of the magnetic head can be adjusted.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a head carriage support mechanism according to the present invention with reference to the accompanying drawings.

Figure 19:
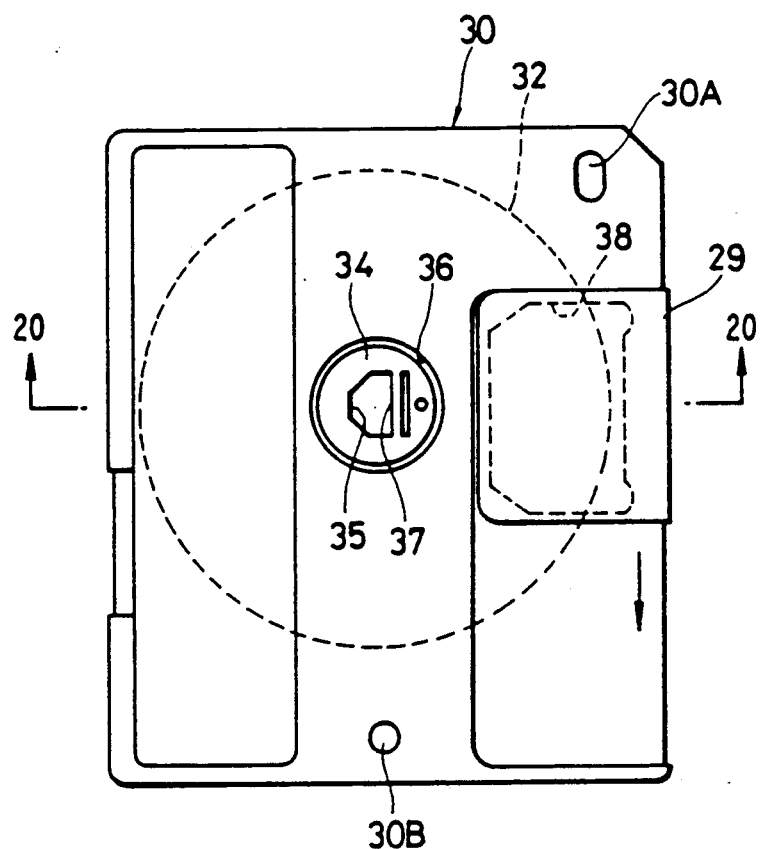
FIG. 19 is a plan view of a magnetic disc pack.

At first, description will be given of a magnetic disc pack which is used in a magnetic recording or reproducing apparatus in an electronic camera or the like. In FIG. 19, there is shown a plan view of the magnetic disc pack 30 and, in FIG. 20, there is shown a section view taken along the line A—A in FIG. 19.

Figure 20:
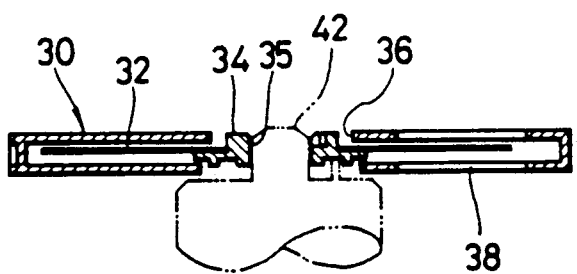
FIG. 20 is a section view taken along the line A—A in FIG. 19.
Figure 21:
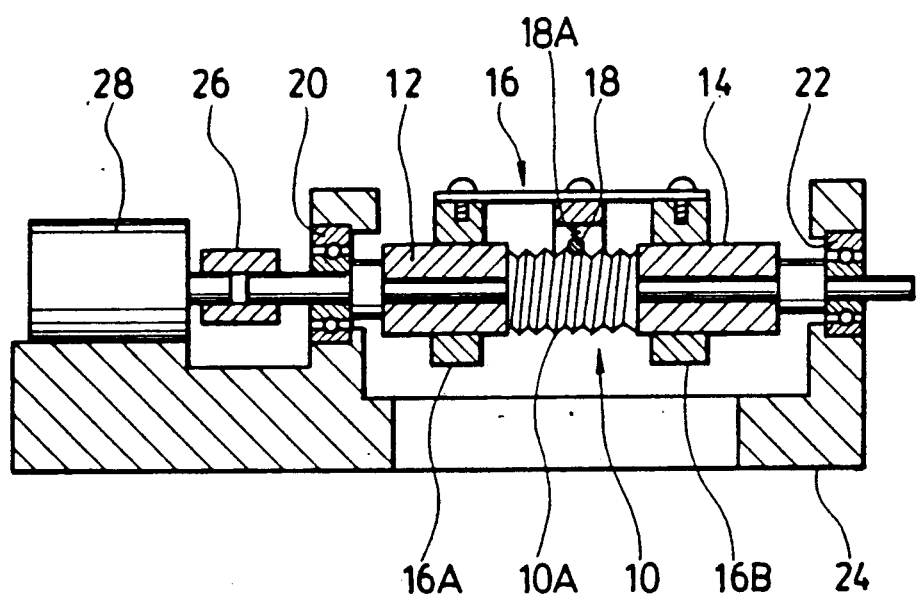
FIG. 21 is a sectional view of a head carriage feeding mechanism according to the prior art.
Figure 22:
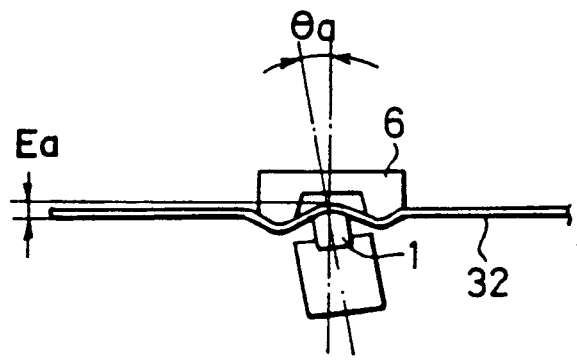
FIG. 22 is an explanatory view to show the projection amount and inclination angle of the magnetic head in the prior art.
Figure 23:
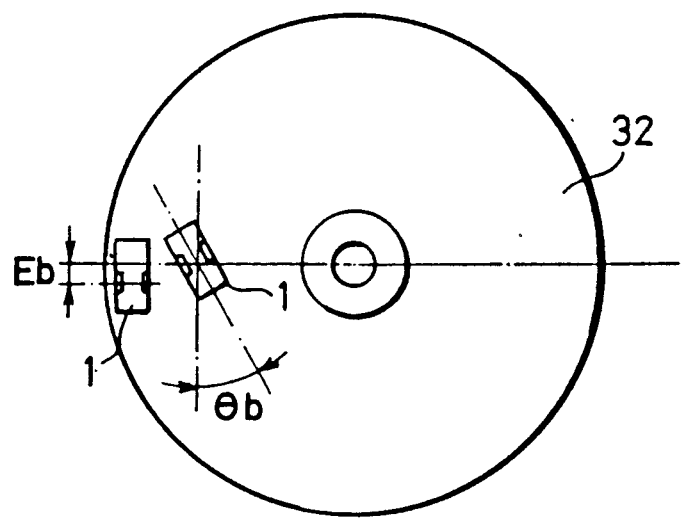
FIG. 23 is an explanatory view to show the shifts of the magnetic head in center alignment and azimuth in the prior art; and, FIG. 24 is an explanatory view to show the tilt of the magnetic head in the prior art.
Figure 24:
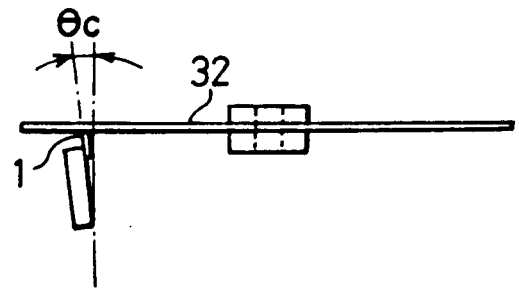

As shown in FIG. 20, the magnetic disc pack 30 is constructed in a substantially square shape and within the magnetic disc pack 30 there is rotatably stored a magnetic disc 32 in which still image information or the like can be recorded. In the central portion of the magnetic disc 32, there is provided a center core 34 which serves as a reinforcing member and the center core 34 is also exposed externally from a circular opening 36 formed in the magnetic disc pack 30. The center core 34 is formed with a central bore 35 and there is provided a resilient piece 37 in the central bore 35. The central bore 35 in the center core 34 can be fitted over a drive shaft 42 (which will be described later) against the energization force of the resilient piece 37.

Also, the magnetic disc pack 30 is formed with a window portion 38 in which a magnetic head 52, to be described later, is positioned and the window portion 38 can be opened or closed by a slidable shutter 29. That is, the shutter 29 serves to prevent dust from adhering to the magnetic disc 32 and also, when recording or reproduction is performed, moves in the downward direction in FIG. 19 to thereby open the window portion 38. Further, the magnetic disc pack 30 is formed with positioning bores 30A, 30B which are used to position the magnetic disc pack 30 at a position where the magnetic recording or reproduction can be performed. By the way, the construction of the above-mentioned magnetic disc pack 30 is defined by a unified standard.

Figure 1:
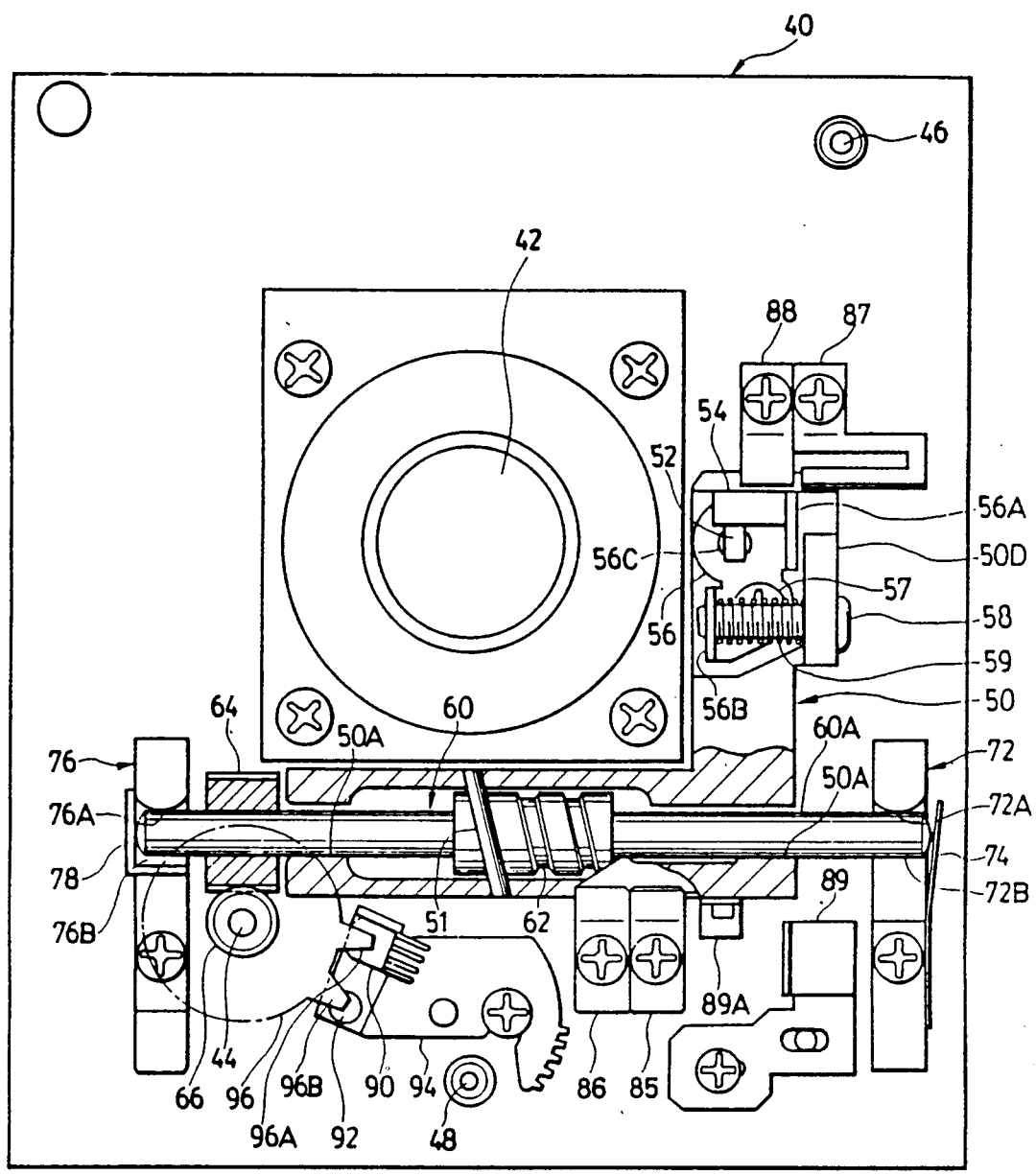
FIG. 1 is a plan view of a magnetic recording/reproducing apparatus to which the present invention is applied.

Referring now to FIG. 1, there is shown a plan view of a magnetic recording/reproduction apparatus to which the present invention is applied.

The above-mentioned magnetic recording/reproducing apparatus comprises a main body 40 in which there is provided a drive shaft 42 that can be fitted into the central bore 35 in the center core 34 of the magnetic disc 32 to rotate the magnetic disc 32 within the magnetic disc pack 30 at a predetermined number of rotations. A drive shaft 44 of a stepping motor is provided that can move a head carriage 50, to be described later, by means of a lead screw 60. Further, in the apparatus main body 40, there are erected guide pins 46 and 48 which can be inserted into the positioning bores 30A and 30B in the magnetic disc pack 30 (FIG. 19) to position the magnetic disc pack 30.

The above-mentioned head carriage 50 has a needle 51 engageable with a threaded portion 62 of the lead screw 60 and also includes two substantially perpendicularly intersecting surfaces 50A and 50B (see FIG. 4) which can be abutted respectively against the shaft 60A of the lead screw 60. Further, to the head carriage 50, there is mounted the magnetic head 52 by means of a head mount plate 54 and a head mount metal member 56.

The above-mentioned head mount metal member 56 is free to rotate around a center shaft 56C provided at a position substantially just below the magnetic head 52 and also can be threadedly mounted to a screw 57 at a suitable rotational position. Also, the head mount metal member 56 is provided with a connection plate 56A and a female threaded portion 56B which are formed by folding. To the connection plate 56A, the head mount plate 54 is attached by adhesives, and between the female threaded portion 56B and a support portion 50D formed integrally with the head carriage 50 there is screwed a bolt 58 by means of a coil spring 59. Thanks to this, the angle of direction of the magnetic head 52 can be adjusted finely by means of the bolt 58. By the way, in the portion of the head mount metal member 56 to which the screw 57 is mounted, there is formed an elongated bore (not shown) so that the head mount metal member 56 can be rotated.

The lead screw 60 is provided in the center portion thereof with the threaded portion 62 which can be engaged with the needle 51 of the head carriage 50 and the two ends of the lead screw 60 are journaled by bearings 72 and 76, respectively. Also, over the lead screw 60, there is fitted gear 64 which is used to transmit a rotational power.

The bearing 72 has two substantially perpendicularly intersecting surfaces 72A and 72B for journaling or supporting the shaft 60A of the lead screw 60 and is also provided with a plate spring 74 which energizes the lead screw 60 in the axial direction thereof. Similarly, the bearing 76 has two substantially perpendicularly intersecting surfaces 76A and 76b for journaling the shaft 60A of the lead screw 60 and is also provided with a stopper 78 for securing the end face of the lead screw 60.

Figure 4:
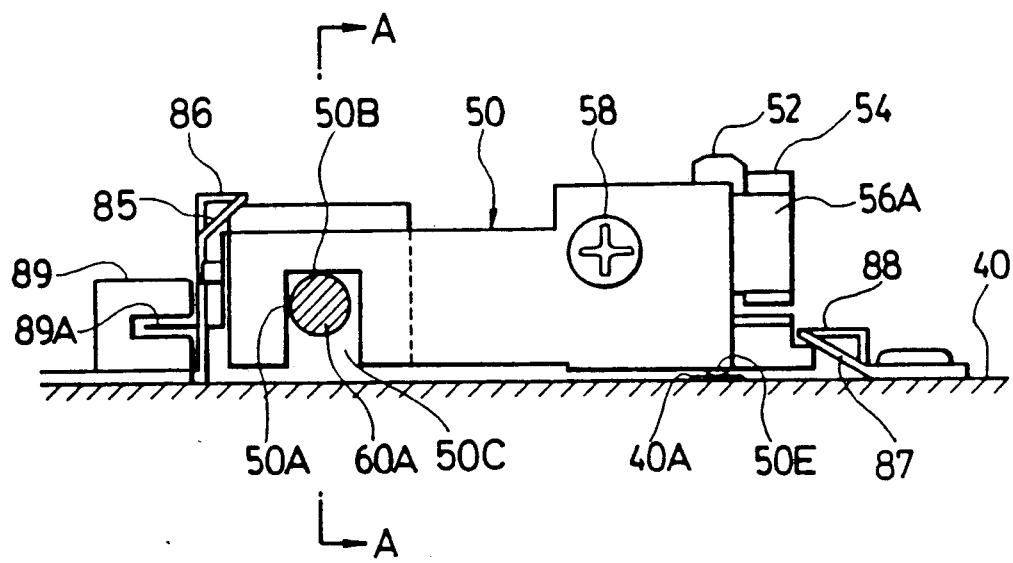
FIG. 4 is a side view of an embodiment of a head carriage shown in FIG. 1.

The head carriage 50, as shown in FIG. 4, is energized in an obliquely downward direction by a plate spring 85, and the two substantially perpendicularly intersecting surfaces 50A, 50B of the head carriage 50 as well as the substantially perpendicularly intersecting surfaces 72A, 72B and 76A, 76B of the bearings 72 and 76 are, respectively, in contact with the shaft 60A of the lead screw 60. Also, in a back position which is located substantially just below the magnetic head 52 of the head carriage 50, there is provided a projection 50E and the head carriage 50 is further energized by a plate spring 87 so that the projection 50E thereof can be brought into contact with the upper surface of the apparatus main body 40 and can be slided thereon. In the drawings, reference numerals 86 and 88 respectively designate stoppers which are used to prevent the head carriage 50 from slipping out of position.

On the other hand, over the drive shaft 44 of the stepping motor for feeding the head carriage, there are fitted a worm 66 and a metal plate 96. The worm 66 intermeshes with a gear 64 mounted to the lead screw 60.

Therefore, when the drive shaft 44 of the stepping motor is rotated, the rotational movement of the drive shaft 44 is reduced by means of the worm 66 and gear 64, and is then transmitted to the lead screw 60. If the lead screw 60 is rotated, then the head carriage 50, the needle 51 of which is in engagement with the threaded portion 62 of the lead screw 60, is moved in the axial direction of the lead screw 60, with the result that the magnetic head 52 is brought into engagement with the drive shaft 42 and is then moved in the radial direction of the rotating magnetic disc 32.

Also, below the metal plate 96, a Hall element 90 and a magnet 92 are mounted on a mount plate 94 which is formed of soft magnetic material. Therefore, when the metal plate 96 is rotated and, as shown in FIG. 1, the projection pieces 96A, 96B of the metal plate 96 appear above the Hall element 90 and magnet 92, respectively, then a magnetic circuit, which passes through the magnet 92, metal plate 96, Hall element 90 and mount plate 94, is caused to close and the closed state can be detected by the Hall element 90.

On the other hand, the apparatus main body 40 is provided with a photo interrupter 89 and the head carriage 50 is provided with a shield plate 89A. For this reason, when the head carriage 50 is moved to a predetermined position, the light emitting section and light receiving section of the photo interrupter 89 are covered by the shield plate 89A and, from the covered state, the photo interrupter 89 can detect that the head carriage 50 is moved to the predetermined position.

That is, by obtaining the above-detected AND function of the photo interrupter 89 and Hall element 90, a home position, which is considered the original position (the movement start point) of the magnetic head 52, can be detected.

Next, description will be given in further detail of the head carriage support mechanism according to the present invention in connection with FIGS. 2 through 5.

Figure 2:
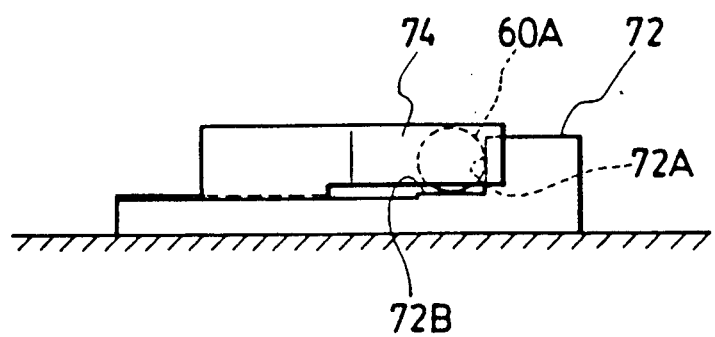
FIGS. 2 and 3 are respectively side views of an embodiment of bearins shown in FIG. 1.
Figure 3:
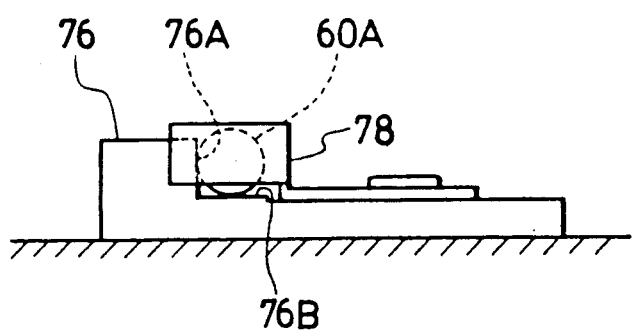
Figure 5:
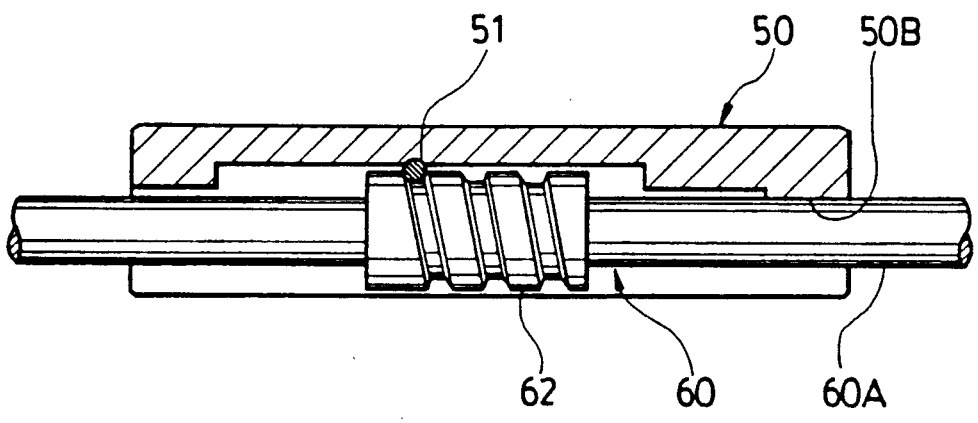
FIG. 5 is a sectional view taken along the line A—A in FIG. 4.

FIG. 2 is a right side view of the bearing 72 shown in FIG. 1, FIG. 2 is a left side view of the bearing 76 in FIG. 1, FIG. 4 is a right side view of the head carriage 50 in FIG. 1, and FIG. 5 is a section view taken along the line A—A in FIG. 4.

In these figures, as discussed before, the bearing 72 has the two substantially perpendicularly intersecting surfaces 72A, 72B for journaling the shaft 60A of the lead screw 60 and is also provided with the plate spring 74 for energizing the lead screw 60 in the axial direction thereof. Similarly, the bearing 76 has the two substantially perpendicularly intersecting surfaces 76A, 76B for journaling the shaft 60A of the lead screw 60 and is also provided with the stopper 78 for securing the end face of the lead screw 60.

Also, as shown in FIGS. 4 and 5, the head carriage 50 is formed with a recessed portion 50C having an opening toward the upper surface of the apparatus main body 40. In the recessed portion 50C, there is connected the needle 51 in a rigid manner.

Also, in the recessed portion 50C, as described before, there are provided the two surfaces 50A, 50A (see FIG. 1) which are in contact with the shaft 60A of the lead screw 60 and intersect the needle 51 substantially perpendicularly. In addition, there is provided a surface 50B which is in contact with the shaft 60A of the lead screw 60 and is substantially parallel with the needle 51. The thus constructed head carriage 50 is energized by the plate spring 85 in the obliquely downward direction (in FIG. 4), in the right downward direction.

Therefore, the surfaces 50A, 50A provided in the recessed portion 50C of the head carriage 50 respectively can be brought into contact with the side surface of the shaft 60A of the lead screw 60, similarly the surface 50B can be brought into contact with the upper surface of the shaft 60A, and the needle 51 can be engaged with the threaded portion 62 of the lead screw 60 from above. That is, the head carriage 50 can be brought into contact with the lead screw 60 by means of 4 points, namely, the surfaces 50A, 50A, 50B provided in the recessed portion 50C and the needle 51.

Next, description will be given of a case where the above-constructed head carriage 50, lead screw 60 and bearings 72, 76 are assembled.

In this case, at first, the bearings 72 and 76 are fixed at a predetermined position in the apparatus main body 40 by screws and at the same time the plate spring 74 and the stopper 78 are also fixed. Then, the lead screw 60 is interposed between the plate spring 74 of the bearing 72 and the stopper 78 of the bearing 76. Subsequently, the plate springs 85 and 87 are mounted at given positions in the apparatus main body 40 and after then these plate springs 85 and 87 are pushed away and the head carriage 50 is fitted over the lead screw 60. Finally, the stoppers 86 and 88 for prevention of the head carriage against slippage are mounted, which completes the assembly.

In the above-mentioned embodiment, as shown in FIG. 5, the needle 51 is rigidly connected to the head carriage 50 and the needle 51 itself is used as means for positioning the vertical direction of the head carriage 50. However, the invention is not limited to this, but, in FIG. 5, in the left side portion of the head carriage 50, a surface similar to the surface 50B may be provided in the head carriage 50. But, in this case, the needle 51 must be energized in the direction of the threaded portion 62 by a spring or other similar means.

Figure 7:
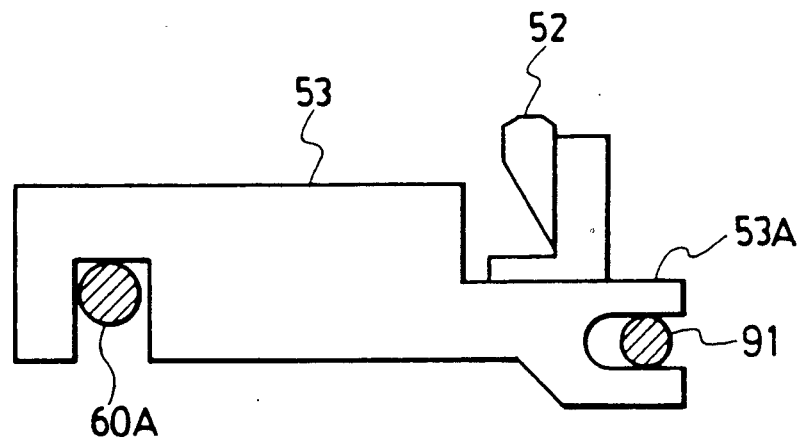
FIG. 7 is a side view of another embodiment of the head carriage according to the invention.

Although in the above embodiment the portion of the head carriage 50 for mounting the magnetic head 50 is energized by means of the plate spring 86 so that the head carriage 50 is prevented against rotation while it is moved, the above means is not limitative, but other various means may also employed to prevent the head carriage against rotation. For example, as shown in FIG. 7, a guide shaft 91 may be provided in parallel with the shaft 60A of the lead screw 60 and an engagement portion 53 engageable with the guide shaft 91 may be provided in a head carriage 53.

Further, in the above-mentioned embodiment, the head carriage 50 is energized obliquely downward by use of a single plate spring 85, but the invention is not limited to this. For example, the head carriage 50 may be energized from above and from laterally by separate springs.

Next, description will be given below of a mechanism which retreats the magnetic head 52 from the magnetic disc.

Figure 8:
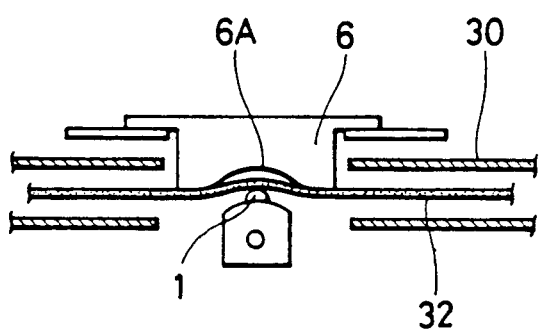
FIG. 8 is a sectional view to show a positional relationship between a magnetic head and a regulation plate.

Generally, when the magnetic recording or reproduction is performed by use of the magnetic head 1, as shown in FIG. 8, a regulation plate 6 having a recessed portion 6A is disposed in the opposite side to the magentic head 1 with the magnetic disc 32 therebetween so that the magnetic disc 32 be located along the magnetic head 1. In this case, since the magnetic head 1 is usually located in such a manner that it projects to a slight degree with respect to the surface of rotation of the magnetic disc 32, if the magnetic head 1 is left projecting with respect to the magnetic disc 32 for a long time, then there can be produced pressure marks in the magnetic disc 32, resulting in the dropout or the like of the magnetic head.

In view of the above circumstances, according to the invention, as discussed before, at the back position of the head carriage 50 which is located substantially just below the magnetic head 52, there is provided the projection 50E for supporting the head carriage 50 and the head carriage 50 is also energized by the plate spring 86 so that the projection 50E can be brought into contact with and slided on the upper surface (that is, slide surface) of the apparatus main body 40.

Figure 6:
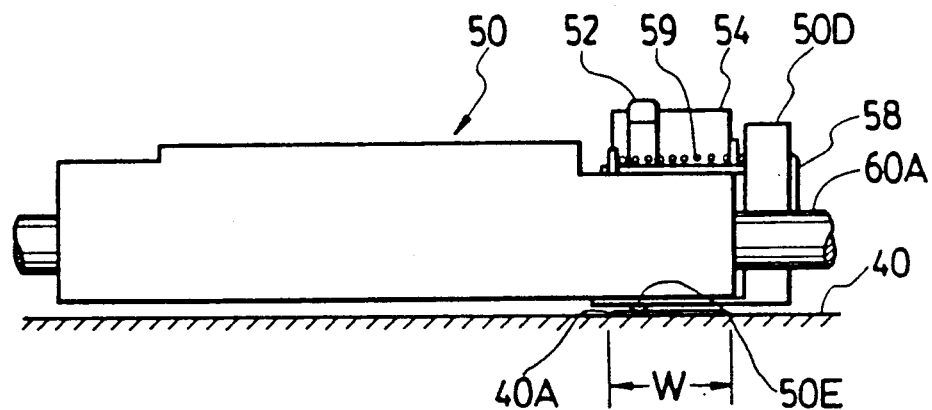
FIG. 6 is a front view of the head carriage shown in FIG. 1.

As shown in FIGS. 4 and 6, there is provided a projection 40A on the above-mentioned slide surface. This projection 40A has a width W substantially equal to the movement area of the magnetic head 52 when the magnetic head 52 performs the magnetic recording or reproduction in a predetermined magnetic recording/reproducing area of the magnetic disc, and also has a height sufficient to retreat the magnetic head 52 from the magnetic disc 32 to thereby part the magnetic head 52 away from the magnetic disc 32.

Therefore, when the head carriage supporting projection 50E is present within the range of the width W of the projection 40A, the magnetic head 52 can be in contact with the magnetic disc 32 to record into or reproduce from the magnetic disc 32. When the magnetic recording or reproduction is ended, if the magnetic head 52 is moved in the radial direction of the magnetic disc 32 and is retreated inside or outside of the magnetic recording/reproducing area of the magnetic disc 32, then the head carriage supporting projection 50E is removed from the projection 40A, with the result that the magnetic head 52 retreats in a direction substantially perpendicularly intersecting the plate of rotation of the magnetic disc 32 and thus it parts away from the magnetic disc 32.

Next, description will be given below of another embodiment of the magnetic head retreating mechanism according to the present invention in connection with FIGS. 9 and 10.

Figure 9:
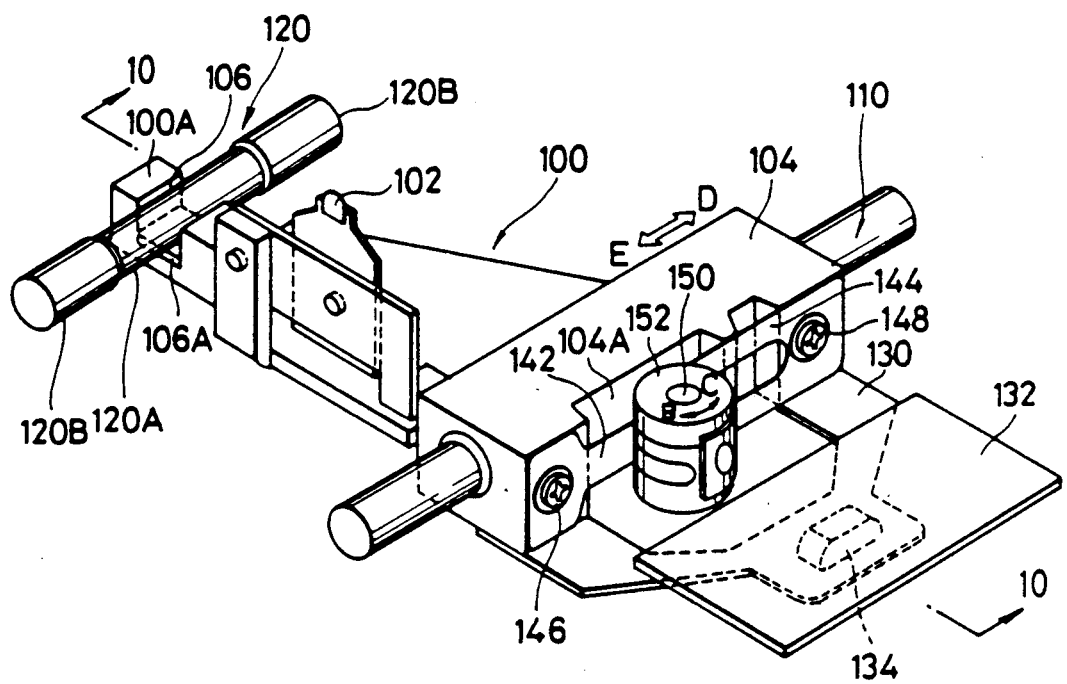
FIG. 9 is a perspective view of a further embodiment of the head carriage support mechanism according to the invention.
Figure 10:
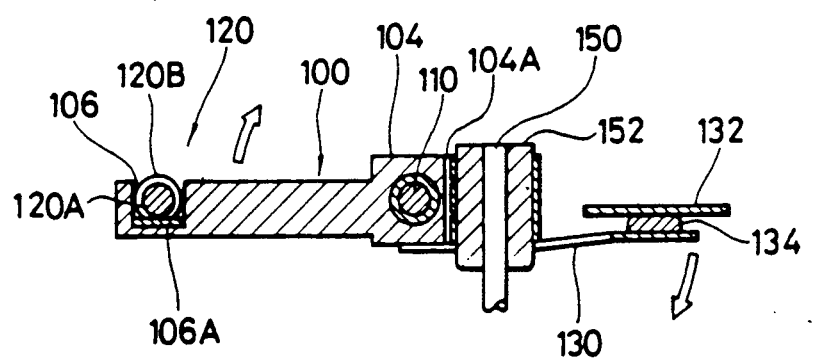
FIG. 10 is a sectional view taken along the line A—A in FIG. 9.

In FIG. 9, a head carriage 100 is provided with a magnetic head 102, and it is also formed with a sleeve portion 104 into which a guide shaft 110 can be slidably inserted and a recessed portion 106 engageable with a guide shaft 120.

There is provided a plate spring 130 on the lower surface of the sleeve portion 104 of the head carriage 100. The plate spring 130 is contact with a plate member 132, which is fixed to the apparatus main body, by means of a slide member 134 and the reaction force of the plate spring 130 is used to energize the head carriage 100 in a clockwise direction in FIG. 10 about the guide shaft 110. Therefore, a slide member 106A, which is provided in the recessed portion 106 of the head carriage 100, can be brought into contact with the lower surface of the guide shaft 120 and the head carriage 100 can be held in a preselected attitude so that the magnetic head 102 can project to a slight degree with respect to the surface of rotation (not shown) of the magnetic disc.

Also, the sleeve portion 104 of the head carriage 100 is provided with strip members 142 and 144 which are mounted at the respective first ends thereof by screws 146 and 148, respectively. The other ends of the strip members 142 and 144 are respectively located in a drum 152 which is fitted over a drive shaft 150. These strip members 142 and 144 are mounted in such a manner that, if the drum 152 is rotated, then one of them is rolled in while the other is rolled back. Further, a rotational drive force from a head carriage feeding stepping motor (not shown) can be applied to the drive shaft 150 after the drive force is properly reduced. In addition, the sleeve portion 104 is formed in such a manner that there can be produced a clearance 104A between the sleeve portion 104 and the drum 152.

Therefore, when the drum 152 is rotated in the direction of an arrow B to roll in the strip member 142, then the head carriage 100 is moved in the direction of an arrow D and, on the contrary, when the drum 152 is rotated in the direction of an arrow C to roll in the strip member 144, then the head carriage 100 is moved in the direction of an arrow E.

On the other hand, the guide shaft 120 comprises a small diameter section 120A and a large diameter section 120B and the boundary the between the small and large sections 120A, 120B is formed in a tapered shape. Only when the slide member 106A, provided in the recessed portion 106 of the head carriage 100, is in contact with the small diameter section 120A of the guide shaft 120, can the magnetic head 102 can be brought into contact with the magnetic disc.

Therefore, if the head carriage 100 is moved such that the magnetic head 102 is moved inside or outside of the preselected magnetic recording/reproducing area of the magnetic disc, then the slide member 106A of the head carriage 100 is moved from the small diameter section 120A of the guide shaft 120 and is brought into contact with the large diameter section 120B thereof, with the result that the head carriage 100 is rotated in a counter clockwise direction about the guide shaft 110 in FIG. 5 so that the magnetic head 102 is moved away from the magnetic disc.

In the above-mentioned embodiment, whether the magnetic head is moved in either direction, that is, inside or outside of the preselected magnetic recording/reproducing area of the magnetic disc, the magnetic head can be retreated from the magnetic disc. However, the invention is not limited to this, but the magnetic head may be retreated only when the magnetic head is moved in one of the directions inside or outside of the preselected recording/reproducing area of the magnetic disc.

Next, description will be given of a method of adjusting the shift in azimuth of the magnetic head.

At first, the principles of the azimuth shift adjusting method according to the invention will be described with respect to FIGS. 11 through 14.

The factor of the azimuth shift produced when the magnetic head is bonded to the head carriage can be classified into two cases in one of which the azimuth is shifted by the shift in center alignment of the magnetic head and in the other of which the azimuth is shifted by the rotation of the magnetic head itself.

Figure 11:
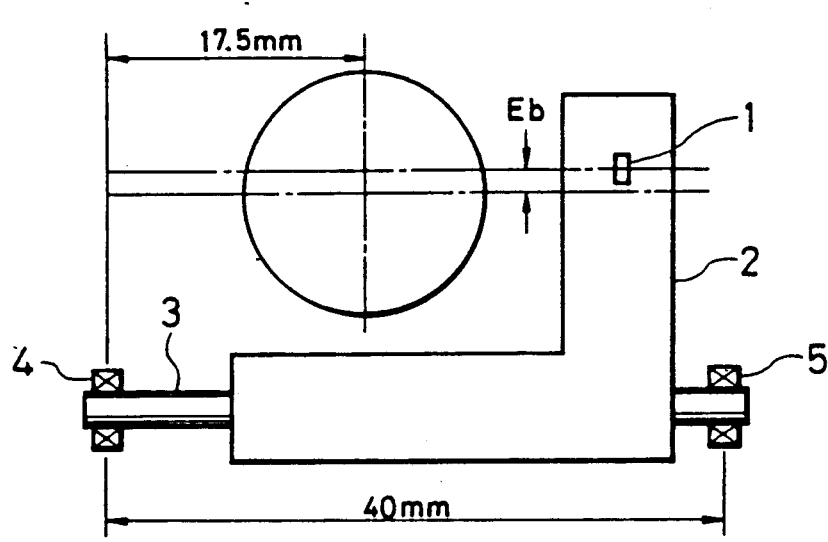
FIGS. 11 through 14 are respectively general plan views of the magnetic recording/reproducing apparatus used to explain the principles of adjusting the azimuth shift of the magnetic head.

In FIG. 11, there is shown a case in which a magnetic head 1 is shifted in center alignment and, as a result of this, the azimuth shift of the magnetic head 1 is produced. In FIG. 11, reference numeral 2 designates a head carriage, 3 a guide shaft, and 4, 5 respectively bearings of the guide shaft 3.

Here, as shown in FIG. 11, it is assumed that the amount of the center alignment shift of the magnetic head is Eb. In order to correct the azimuth shift caused by the center shift amount Eb, the guide shaft 3 of the head carriage 2 may be moved by the amount Eb in the downward direction in FIG. 11 to correct the center shift Eb (and thus the azimuth shift caused by the center shift).

Figure 12:
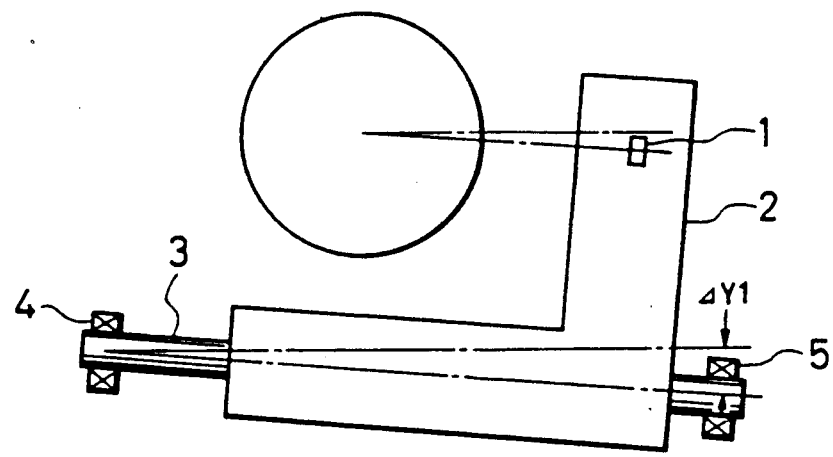

Although, in the mentioned case, both of the bearings 4, 5 are moved by the amount Eb to correct the azimuth shift due to the center shift, alternatively, only one of these bearings may be moved to rotate the head carriage 2 so that the azimuth shift due to the center shift can be corrected as well. In FIG. 12, there is shown a case in which only the bearing 5 is moved to correct the azimuth shift caused by the above-mentioned center shift. Here, when the above-mentioned azimuth shift amount Eb is 50μ, the amount of movement of the bearing 5, ΔY1, can be obtained by the following equation:

$$\Delta Y1 = 50\mu \times 40/17.5 = 114.2\mu \qquad (1)$$

Next, description will be given of a case wherein the rotational bonding of the magnetic head itself gives rise to the azimuth shift of the magnetic head.

Figure 13:
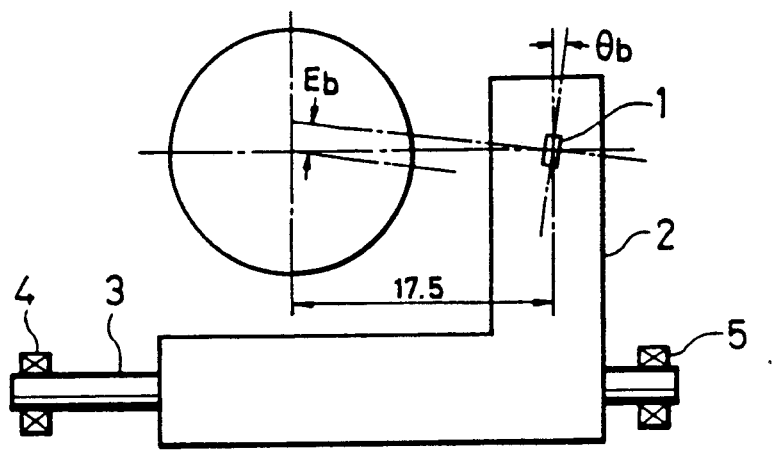

Here, as shown in FIG. 13, if it is assumed that the amount of the azimuth shift of the magnetic head 1 is θb, then the azimuth shift can be converted in the term of the center shift amount Eb by the following equation:

$$Eb = 17.5 \text{ mm} \times \theta b \qquad (2)$$

where 17.5 mm is the radius of a track TR 26 which is located substantially centrally of tracks TR 01 through TR 50 provided in the magnetic disc.

Figure 14:
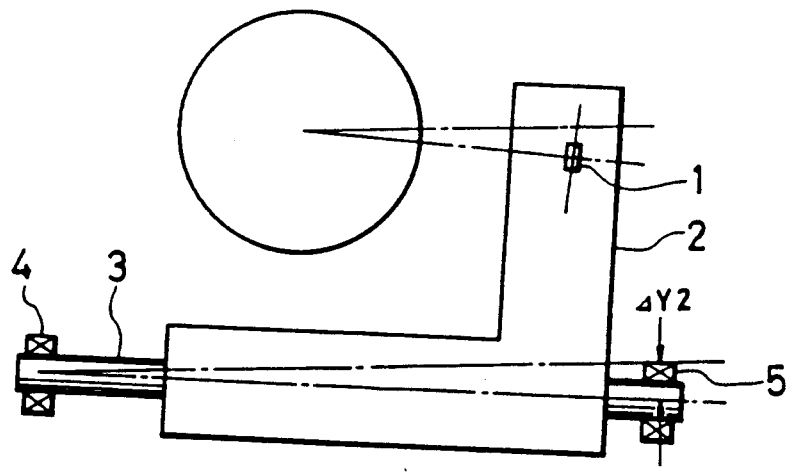

Therefore, as in the correction of the azimuth shift caused by the above-mentioned center shift, the azimuth shift in this case can also be corrected by moving the head carriage 1 by Eb in the downward direction in FIG. 13 or by inclining the head carriage 1 as shown in FIG. 14. For example, when the azimuth shift θb is 12, Eb is obtained as 61μ from the above-mentioned equation (2) and, therefore, the movement amount of the bearing 5 in FIG. 14, similarly as the first equation (1), can be obtained by the following equation:

$$\Delta Y2 = 61\mu \times 40/17.5 = 140\mu \qquad (3)$$

However, the azimuth shift in Track TR 25 is 0, while the azimuth shift in Tracks TR 01 and TR 50 is about 3.5.

Therefore, when the center shift amount is 50μ and the angle of rotation of the magnetic head itself is 12, if you try to correct the center shift by use of only bearing 5, then the amount of movement of the bearing 5 can be obtained by the following equation:

$$\Delta Y = \Delta Y1 + \Delta Y2 = 114\mu + 140\mu = 254\mu \qquad (4)$$

It should be noted here that the above-mentioned three equations (1) through (3) are respectively approximate equations derived from the geometric relations of the parts shown in FIG. 11, but the invention is not limited to this. Also, when the bearing 5 is moved by 254μ, then the amount of the home position of the magnetic head 1 is about 77μ.

Figure 15:
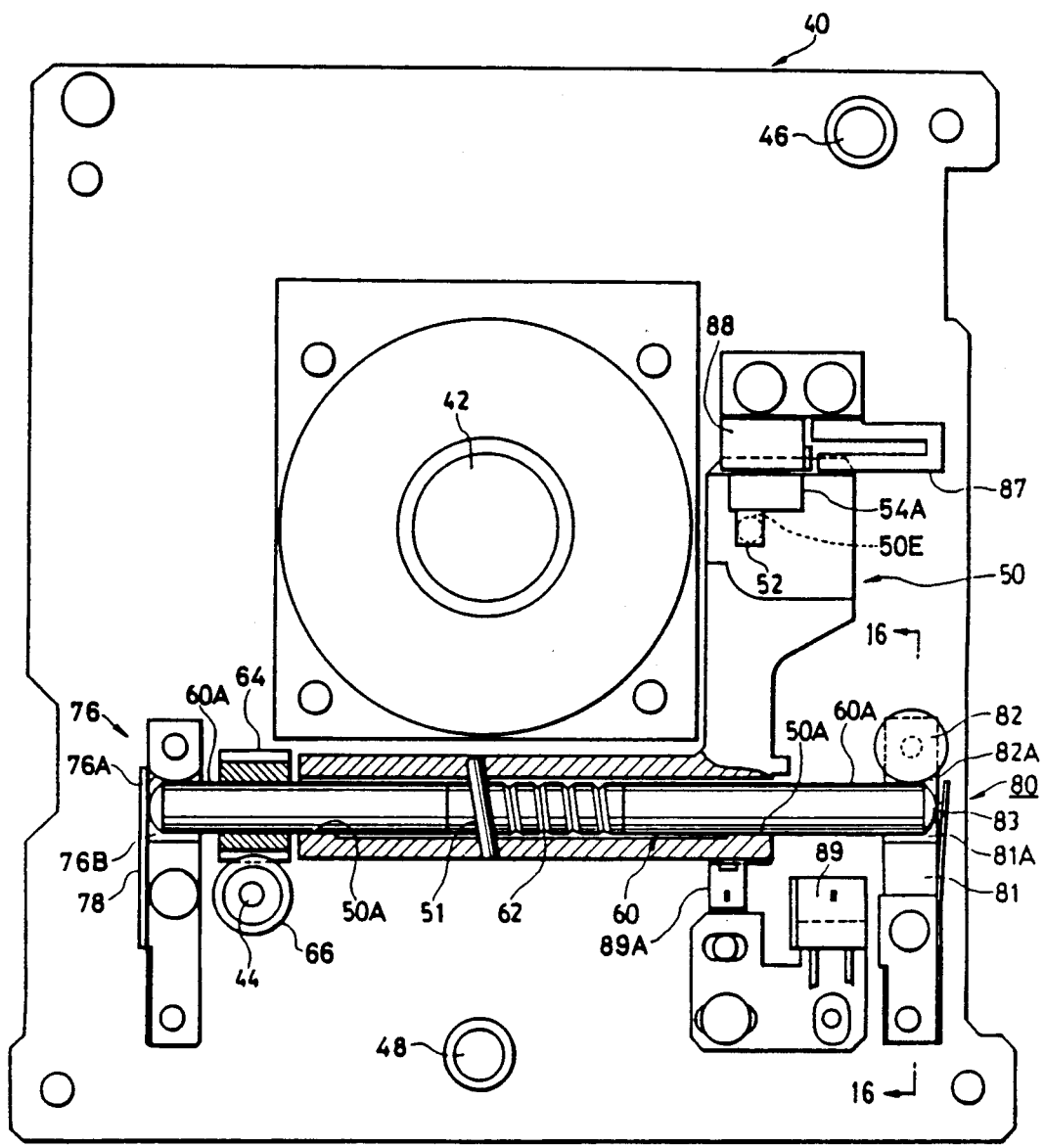
FIG. 15 is a plan view of another embodiment of a magnetic recording/reproducing apparatus.

Referring now to FIG. 15, there is shown a plan view of another embodiment of the magnetic recording/reproducing apparatus to which the present invention is applied. In FIG. 15, parts commonly used or having the same functions as in FIG. 1 are given the same designations and the detailed description thereof is omitted here.

The magnetic recording/reproducing apparatus shown in FIG. 15 is different from the apparatus shown in FIG. 1 mainly in that a magnetic head 52 is mounted to a head mount portion 54A provided integrally with the head carriage 50 and also in the structure of a bearing 80 provided on the right side thereof.

In particular, the bearing 80 comprises a bearing member 81 having a horizontal surface 81A for journaling the guide shaft 60A of the lead screw 60, a cam pin 82 having a cam surface 82A to be brought into contact with the guide shaft 60A, and a plate spring 83 for energizing the lead screw 60 in the axial direction thereof.

Also, in FIG. 15, there is provided a left bearing 76 provided with a vertical surface 76A which is formed in a curved shape and thus which receives the one end of the guide shaft 60A at a point thereof. And, when the guide shaft 60A is rotated, the receiving point provides the fulcrum of rotation of the guide shaft 60A.

Figure 16:
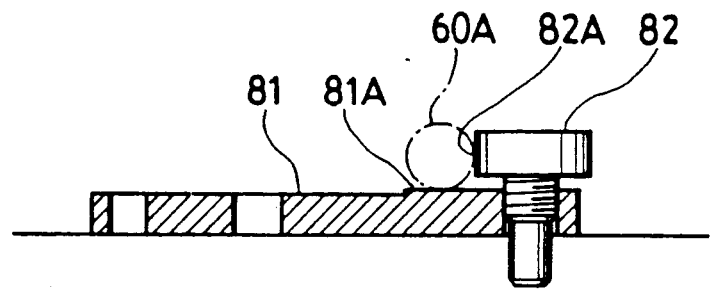
FIG. 16 is a sectional view taken along the line A—A in FIG. 15.
Figure 17:
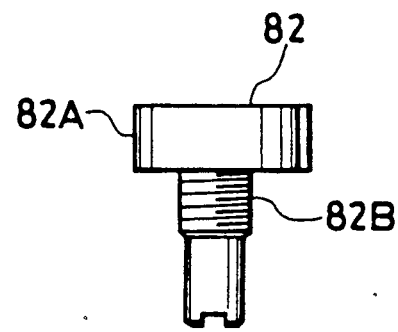
FIG. 17(A) is an enlarged view of a cam pin shown in FIG. 6.
FIG. 17(B) is a bottom view of FIG. 17(A)
Figure 17:
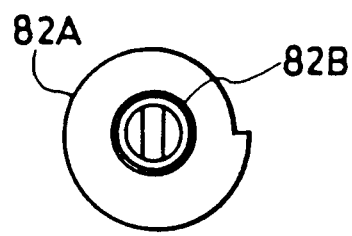

FIG. 16 is a section view taken along the line A-A in FIG. 15, FIG. 17(A) is an enlarged view of the cam pin 82 shown in FIG. 16, and FIG. 17(B) is a bottom view of FIG. 17(A). The cam pin 82 is provided with a cam surface 82A in the pin head portion thereof and a screw 82B engageable with the bearing member 81. Therefore, by rotating the cam pin 82, the cam pin 82 can be threadedly mounted to the bearing member 81 and the rotational position of the cam pin 82 can be used to move the guide shaft 60A in the upward direction in FIG. 15. That is, the head carriage 50 can be rotated about the bearing 76, so that, as shown in FIGS. 12 and 14 discussed before, the azimuth of the magnetic head can be adjusted.

Figure 18:
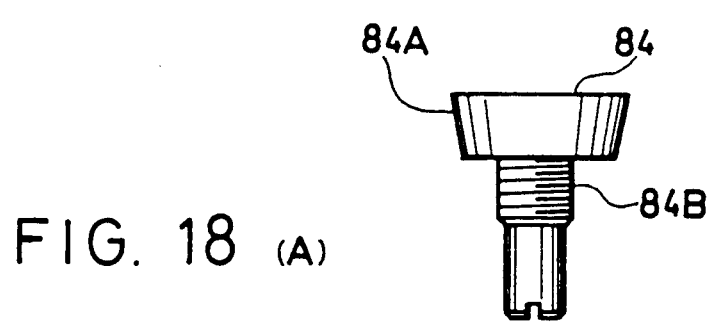
FIG. 18(A) is a view of another embodiment of adjusting means.
FIG. 18(B) is a bottom view of FIG. 18(B)
Figure 18:
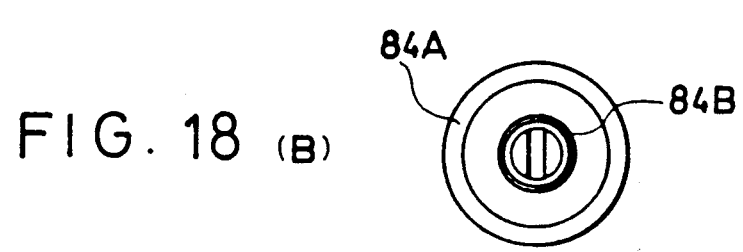

Referring now to FIG. 18, there is shown another embodiment of an adjusting member for moving the guide shaft 60A wherein a taper pin 84 is used in place of the above-mentioned cam pin 82. Specifically, FIG. 18(A) is an enlarged view of the taper pin 84 and FIG. 18(B) is a bottom view of FIG. 18(A).

The taper pin 84 is provided with a taper surface 84A in the pin head thereof and a screw 84B engageable with the bearing member 81. Therefore, if the taper pin 84 is rotated for threaded engagement with the bearing member 81 and is then moved in the axial direction thereof, then the guide shaft 60A can be moved in the vertical direction in FIG. 15 by means of the taper surface 84A.

Since there are arranged a gear 64 for power transmission and the like on the left side of the lead screw 60, it is preferred that the bearing 76 is constructed to be immovable as in the illustrated embodiment, but, alternatively, the bearing 76 may be constructed so as to be movable, provided that the power transmission to the lead screw 60 is possible.

Also, in the illustrated embodiment, it is true that the tilt and angle of inclination of the magnetic head cannot be adjusted, but there is no possibility that these may be out of order beyond an allowable range because of hardening of adhesives.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of supporting a head carriage, adhesively bonded to a magnetic head and being movable in the radial direction of a rotating magnetic disc to magnetically record or reproduce from said magnetic disc, the movement of the head carriage being along a guide shaft for guiding said head carriage, the guide shaft defining an axial direction and being supported at its opposite ends by a respective bearing, the method comprising:

allowing at least one of said bearings to be moveable freely in a direction perpendicularly intersecting the axial direction of said guide shaft, and, after said magnetic head is adhesively bonded to said head carriage, moving said freely movable bearing to thereby parallelly move or incline said head carriage within a plane parallel to a magnetic recording/reproducing surface so as to adjust the azimuth shift of said magnetic head.

2. A head carriage support method as set forth in claim 1, wherein said azimuth shift of magnetic head is adjusted in such a manner that said azimuth shift is zero when said magnetic head is positioned substantially centrally of the magnetic recording/reproducing area of said magnetic disc.

3. A mechanism for supporting a head carriage provided with a magnetic head movable in the radial direction of a magnetic disc recording/reproducing surface to magnetically record into or reproduce from said magnetic disc, comprising: a guide shaft having opposing ends, said guide shaft being operative to guide said head carriage; two bearings for rotatably supporting said guide shaft in the two ends thereof, each of said two bearings comprising a first surface touchable with said guide shaft and oriented in a direction substantially parallel with the disk magnetic recording/reproducing surface, a second surface substantially perpendicularly intersecting said first surface, and an adjust member for moving said second surface of at least one of said two bearings in a direction intersecting perpendicularly the axial direction of said guide shaft, whereby said adjust member can be used to adjust the azimuth shift of said magnetic head.

4. A head carriage support mechanism as set forth in Claim 3, wherein said adjust member comprises a cam pin provided in the peripheral surface thereof with a cam surface serving as said second surface, and said second surface can be advanced or retreated by means of the rotational positions of said cam pin.

5. A head carriage support mechanism as set forth in Claim 3, wherein said adjust member comprises a taper pin provided in the axial direction thereof with a taper surface serving as said second surface, and said second surface can be advanced or retreated by the axial movement of said taper pin.

6. A head carriage support mechanism as set forth in Claim 3, wherein one of said two bearings respectively provided in the two ends of said guide shaft is provided with a stopper for securing one end face of said guide shaft and the other bearing is provided with a spring for energizing the other end face of said guide shaft in the direction of said stopper.

* * * * *